United States Patent
Li et al.

(10) Patent No.: US 9,221,696 B2
(45) Date of Patent: Dec. 29, 2015

(54) WASTEWATER TREATMENT PROCESS BY ELECTROCHEMICAL APPARATUS

(71) Applicants: Yanbo Li, Beijing (CN); Andrew Ronald MacDonald-Hardie, Beijing (CN)

(72) Inventors: Yanbo Li, Beijing (CN); Andrew Ronald MacDonald-Hardie, Beijing (CN)

( * ) Notice: Subject to any disclaimer, the term of this patent is extended or adjusted under 35 U.S.C. 154(b) by 0 days.

(21) Appl. No.: 14/386,002

(22) PCT Filed: Apr. 3, 2013

(86) PCT No.: PCT/CN2013/073754
§ 371 (c)(1),
(2) Date: Sep. 18, 2014

(87) PCT Pub. No.: WO2013/152692
PCT Pub. Date: Oct. 17, 2013

(65) Prior Publication Data
US 2015/0041333 A1 Feb. 12, 2015

(30) Foreign Application Priority Data
Apr. 9, 2012 (CN) .......................... 2012 1 0102506

(51) Int. Cl.
| C02F 1/46 | (2006.01) |
|---|---|
| C02F 1/467 | (2006.01) |
| C02F 101/10 | (2006.01) |
| C02F 101/16 | (2006.01) |
| C02F 101/30 | (2006.01) |
| C02F 101/38 | (2006.01) |
| C02F 1/72 | (2006.01) |
| C02F 1/461 | (2006.01) |
| C02F 103/34 | (2006.01) |

(52) U.S. Cl.
CPC .............. *C02F 1/4672* (2013.01); *C02F 1/727* (2013.01); *C02F 2001/46147* (2013.01); *C02F 2101/101* (2013.01); *C02F 2101/16* (2013.01); *C02F 2101/30* (2013.01); *C02F 2101/38* (2013.01); *C02F 2101/40* (2013.01); *C02F 2103/343* (2013.01); *C02F 2201/461* (2013.01); *C02F 2201/4613* (2013.01); *C02F 2201/4614* (2013.01); *C02F 2201/4617* (2013.01)

(58) Field of Classification Search
CPC .. C02F 1/4672; C02F 1/727; C02F 2103/343; C02F 2001/46147; C02F 2101/101; C02F 2101/16; C02F 2101/30; C02F 2101/38; C02F 2101/40; C02F 2201/461; C02F 2201/4614
See application file for complete search history.

(56) References Cited

U.S. PATENT DOCUMENTS

| 4,384,943 A | 5/1983 | Stoner et al. |
|---|---|---|
| 2005/0173262 A1 | 8/2005 | Nakanishi |
| 2007/0007145 A1* | 1/2007 | Simmons et al. ............. 205/357 |
| 2012/0031852 A1 | 2/2012 | Aglietto |

FOREIGN PATENT DOCUMENTS

| CN | 1898162 | 1/2007 |
|---|---|---|
| CN | 101041488 | 9/2007 |
| CN | 101412548 | 4/2009 |
| CN | 101798160 | 8/2010 |
| CN | 102381791 | 3/2012 |
| JP | 2008-264717 | 11/2008 |

* cited by examiner

*Primary Examiner* — Arun S Phasge
(74) *Attorney, Agent, or Firm* — Soroker-Agmon

(57) ABSTRACT

A wastewater treatment process by an electrochemical apparatus, said apparatus having at least an electrochemical electrode (30), and said electrochemical electrode (30) having suitable electrode plates comprises the following steps: passing high concentration wastewater containing undesirable solutes through at least one electrochemical electrode (30) to which a DC electrical current is applied to destroy the undesirable solutes in the water intake, so as to output water having a lower concentration of the undesirable solutes; the DC current applied to the electrochemical electrode (30) comprises at least a constant potential difference stage exerted on both ends of the electrochemical electrode (30), and followed by a constant current stage through the electrochemical electrode (30).

12 Claims, 2 Drawing Sheets

WASTEWATER TREATMENT PROCESS BY ELECTROCHEMICAL APPARATUS

TECHNICAL FIELD

This invention relates to a method for the treatment of concentrated wastewaters which achieves almost total destruction of undesirable solutes present in the wastewaters, such solutes may be organic or inorganic in nature, thereby producing a product water containing a low, or very low concentration of said solutes.

BACKGROUND

In many industries strong wastewaters are produced which contain high concentrations of certain undesirable solutes the concentrations of which have to be substantially reduced before they are discharged to the environment. Said undesirable solutes include organic compounds, ammoniacal nitrogen, sulfides, and cyanides. The aforementioned strong wastewaters typically have high concentrations of dissolved solids such that they are difficult to treat using conventional wastewater treatment techniques. Frequently the undesirable solutes that need to be treated in such strong wastewaters are poisonous to the bacteria essential to biological treatment processes so even if they are diluted with other wastewaters, in order to reduce their strength, they will still disrupt and decrease the effectiveness of biological waste water treatment processes. As environmental regulations become more restrictive worldwide it is becoming very difficult to meet the required discharge limits if the strong wastewaters are mixed with other weaker wastewaters for treatment. As a consequence it is becoming a necessity that the strong wastewaters are treated by themselves. In industrial applications, treatment of strong wastewaters is at present mostly based on incineration and oxidation systems. Incineration of waste with very high concentration of organic matter, whether it be dissolved or not, is a long established industrial process. More and more, incineration is being considered as a treatment option for wastewaters with low to medium concentrations of dissolved organic matter and also strong wastewaters containing other difficult to destroy solutes.

The major advantages of such prior art treatment methods include the following:
1) The undesirable solutes are totally destroyed
2) The process is non-selective in that all and every undesirable solute present in the wastewater are treated, that is destroyed The major disadvantages of such prior art waste treatment methods include the following:
1) The process consumes a large amount of energy when treating waste waters with low to medium concentrations of organic material.
2) The capital cost of the incineration apparatus is high particularly due to the need to minimize emissions to the atmosphere which if not dealt with adequately will cause further environmental issues.

Alternatives to incineration for the destruction of the undesirable solutes in strong waste waters are so called Advanced Oxidation Processes. There are several advanced oxidation processes that are known to us that are used to treat strong waste waters which all rely on the same basic principle. Advanced oxidation processes are designed to ensure that a population of hydroxyl radicals is generated.

Once the hydroxyl radicals, which are a very strong oxidant, are generated they attack virtually all organic species dissolved in the wastewater. Processes that are included in the Advanced Oxidation Processes are wet oxidation, wet air oxidation, wet peroxide oxidation, Fenton's reaction, ozonation and electrochemical oxidation, plus several others which to a large extent are variants of the foregoing. The main difference between these processes is in the manner in which they form hydroxyl radicals. The prior art Advanced Oxidation Processes known to us have certain advantages and disadvantages.

Wet oxidation and wet air oxidation processes have been used for many years to treat strong waste waters. The major advantages of such prior art oxidation methods include the following:
1) Wet oxidation and wet air oxidation will reliably destroy a proportion of all of the undesirable solutes in strong waste water, both organic and inorganic solutes, regardless of the chemistry of the waste water
2) The process consumes less energy than incineration when treating waste waters with low to medium concentration of contaminants The major disadvantages of such prior art oxidation methods include the following:
1) Wet oxidation and wet air oxidation will not achieve 100% destruction of the undesirable solutes present in the strong wastewater and the treated waste water will normally require post treatment, for example in a biological treatment system, before disposal
2) Wet oxidation and wet air oxidation systems are operated at high temperature and pressure and as a consequence the capital investment cost is high. The use of a catalyst to increase the rate of reaction has been introduced as an enhancement of the process which has resulted in the lowering of operating temperatures with a subsequent decrease in the capital cost, however operating costs have increased.

Wet peroxide oxidation systems have been utilized to treat certain strong waste waters. In this process hydrogen peroxide is encouraged to decompose to generate hydroxyl radicals which then go on to initiate the desired chain reactions necessary to destroy the undesirable solutes. The major advantages of such prior art oxidation methods include the following:
1) The process is practiced at lower temperature and pressure compared to wet oxidation and wet air oxidation so as a consequence the capital cost of the system is lower The major disadvantages of such prior art oxidation include the following:
1) Wet peroxide oxidation will not normally achieve 100% destruction of the undesirable solutes
2) The process uses a significant amount of hydrogen peroxide which means that operating costs are high
3) The wet peroxide oxidation process has to be carefully controlled
4) The performance of the process is dependent upon the strong wastewater chemistry Other Advanced Oxidation Processes known to us that have been practiced in industry to treat strong wastewaters are Fenton's Reaction, modified-Fenton's Reaction, and ozonation either by itself at high pH or in combination with other processes or reagents such as ultraviolet light or hydrogen peroxide.

The aforementioned processes are very different from each other but they all are practiced at low temperature and pressure and as a consequence have lower capital investment costs than the hot Advanced Oxidation Processes The advantages of such prior art oxidation processes include:
1) The aforementioned processes are very different from each other but they all are practiced at low temperature and pressure and as a consequence have lower capital investment costs than the hot Advanced Oxidation Processes The disadvantages of such prior art oxidation processes include the following:

1) All three processes and their variants reliably achieve only partial destruction of the undesirable solutes present in the strong waste waters
2) The performance of each of the processes is very dependent upon the chemistry of the strong waste waters. There are several oxidation termination reactions that can occur in each of the processes which are highly influenced by the chemical analysis of the strong waste waters being treated
3) In the case of the Fenton's Reagent and modified-Fenton's Reagent chemical usage is very high. In the case of ozonation energy consumption is high. As a consequence these processes have high operating costs and in reality the processes are only really suitable for treating wastewaters with low concentrations of the undesirable solutes.

So there are certain common disadvantages with the aforementioned prior art oxidation processes which can be summarized as:

1) They only achieve partial destruction of the undesirable solutes present in the strong waste waters.
2) The overall cost of ownership when computed considering both the capital cost and the operating cost of the systems is high.

Another Advanced Oxidation Process known to us is electrochemical oxidation. This process has characteristics which point to some particular advantages when compared to other prior art oxidation processes if specific electrode materials are utilized. In particular boron doped diamond has been shown to exhibit very beneficial and helpful properties such that apparatus including electrochemical cells utilizing this electrode material have demonstrated the following characteristics:

1) When operated at specific conditions, in particular when the power supplied to the cell is controlled adequately, it is possible to generate an abundant population of hydroxyl radicals. The generation of hydroxyl radicals is controlled by conditions at the surface of the electrode and not by the chemistry of the waste water or any precursor chemical reaction.
2) The electrochemical oxidation process has proved capable of destroying virtually any dissolved organic matter
3) It is possible to destroy inorganic species such as sulfides, ammoniacal nitrogen
4) The electrochemical oxidation process is not particularly affected by the chemistry of the wastewater
5) The undesirable solutes can be, to all intents and purposes, totally destroyed.

Nonetheless the electrochemical oxidation processes known to us for treatment of waste waters exhibit major shortcomings and deficiencies. Such shortcomings and deficiencies include:

1) Most if not all materials used for the electrodes in the electrochemical cells are susceptible to fouling by certain organic and inorganic species that are present during the oxidation of wastewaters. The fouling that occurs has been shown to inhibit the oxidation process which results in a decrease in the rate of destruction of the undesirable solutes, and often causes the complete termination of the process. The presence of the fouling has the consequence of increasing the electrode area required to treat the waste water, which increases the capital cost of the system often making the process economically nonviable. If the fouling terminates the process then the result is incomplete destruction of the undesirable solutes.

2) The electrical energy consumed by electrochemical oxidation when destroying the undesirable solutes present in the wastewaters has proved to be high, such that the economic viability of the process is questionable.

Thus a continuing demand exists for a simple, effective, and inexpensive process which can reliably treat strong wastewaters to substantially achieve total destruction of the undesirable solutes present in such wastewaters. It would be desirable to achieve such treatment in equipment that requires a minimum of maintenance. In particular, it would be desirable to lower both operating costs and capital costs for strong wastewater treatment systems as is required in various industries, such as oil processing, chemical production, pharmaceuticals, and municipal waste disposal.

Clearly, if a new waste water treatment process were developed and made available that utilizes the potential advantages of electrochemical oxidation whilst addressing the major disadvantages of prior art processes and minimizing them it would be of significant benefit. In summary, an economically important new strong waste water treatment system would necessarily offer some (if not most) of the benefits of electrochemical oxidation using the most effective electrode materials available whilst at the same time any such new process must be capable of effectively coping with the problems which beset all advanced oxidation processes and in particular those methods based on electrochemical oxidation.

SUMMARY OF THE INVENTION

From the foregoing, it will be apparent that one important and primary object of the present invention resides in the provision of a novel method for treatment of strong wastewaters containing undesirable solutes to reliably produce a treated water with low, or very low concentrations of the said solutes such that further treatment to remove the pollutants is not necessary. More specifically, an important object of our invention is to provide an electrochemical based advanced oxidation method which is capable of avoiding known problems with such processes so as to reliably provide a method of destroying undesirable solutes in strong waste waters to produce treated water with low or very low concentrations of said solutes.

In this patent where we have used the term "equal", such as set forth in claim 5 in step c) ii) and step c) Vi), we do not mean absolutely equal in the mathematical sense, we mean equal in the industrial significance or in the engineering significance. Expressed in an alternative way, we mean equal within an error range which is sensible from an industry or engineering perspective.

The benefit of this patent invention can be summarized as follows:

1) It is an advantage of the new process that on an overall cost of ownership basis, a process is provided which is cheaper to own and operate than other strong wastewater treatment systems
2) It is an advantage of the new process that it is reliably capable of producing treated water with very low concentrations of most if not all organic compounds dissolved in the strong wastewater
3) It is an advantage of the new process that it is reliably capable of producing treated water with very low concentrations of ammoniacal nitrogen
4) It is an advantage of the new process that it will produce treated water with very low levels of certain inorganic solutes such as sulfides and cyanides
5) It is an objective of the new process that it will destroy the aforementioned undesirable solutes in the strong wastewater to concentrations which will permit the treated water to be discharged to the environment without any further treatment to remove the undesirable solutes 6) It is an objective of the new process that the electrochemical cell is operated to ensure that there is an abundant population of hydroxyl radicals generated under all conditions 7) It is an objective of the new process that it not require "close control", and accordingly it is easily able to cope with variability of the feedwater 8) It is an advantage of my novel process that it is extremely efficient and that the energy required is much lower than other electrochemical oxidation processes with comparable capability.

Other important objects, features, and additional advantages of my invention will become apparent to those skilled in the art from the foregoing, and from the detailed description which follows, and from the appended claims, in conjunction with the accompanying drawings.

BRIEF DESCRIPTION

In order to enable the reader to attain a more complete appreciation of the invention, and of the novel features and the advantages thereof, attention is directed to the following detailed description when considered in connection with the accompanying drawings, wherein.

The foregoing figures, being merely exemplary, contain various process steps or treatment elements that may be present or omitted from actual implementations depending upon the circumstances.

An attempt has been made to draw the figures in a way that illustrates at least those elements that are significant for an understanding of the various embodiments and aspects of the invention. However various other process steps may be utilized in order to provide a complete wastewater treatment system suitable for use in a particular set of circumstances.

Figure 1:
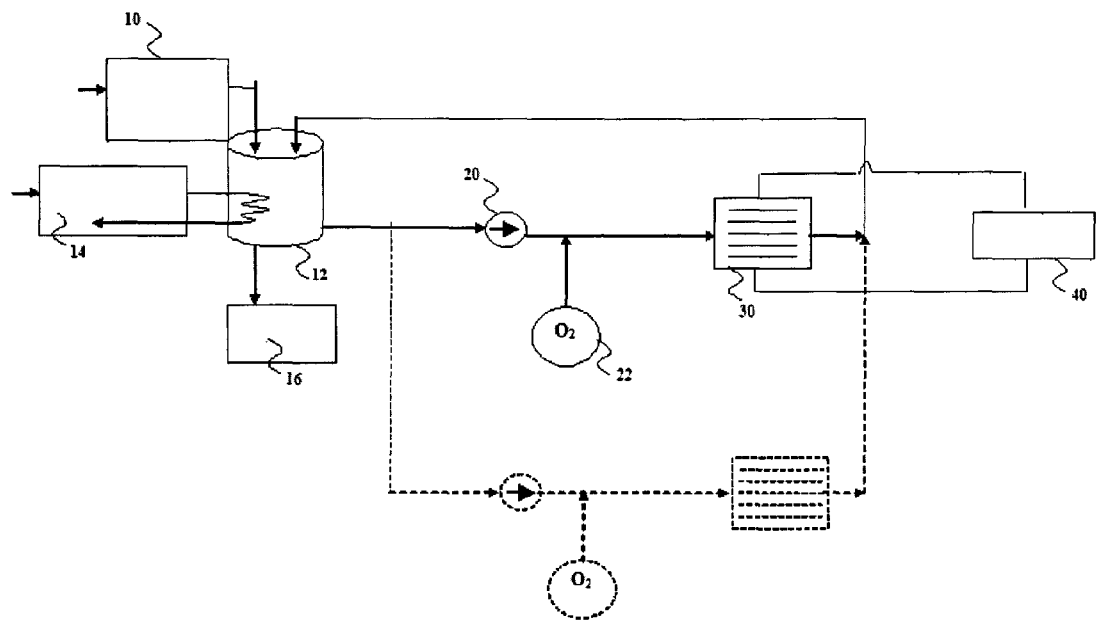
FIG. 1 illustrates a generalized process flow diagram for employing our novel wastewater oxidation process in a variety of applications and with a variety of feedwaters.
Figure 2:
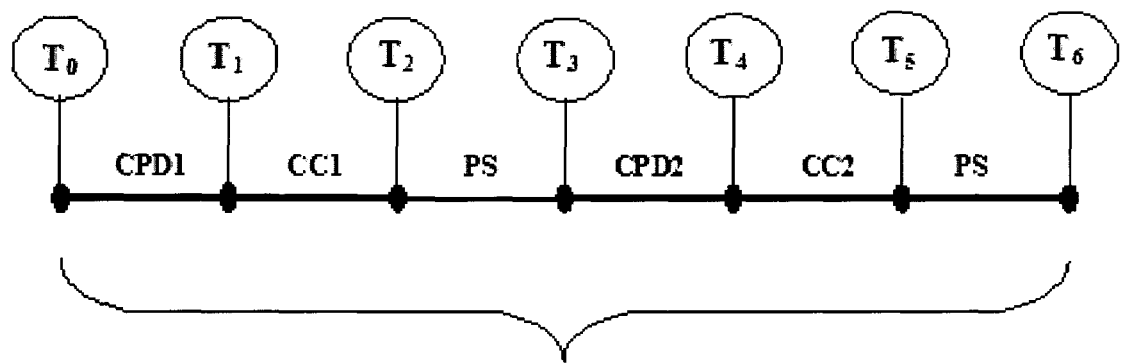
FIG. 2 illustrates the profile of the power applied to the electrochemical cell utilized in our novel process.

In FIG. 1 a generalized flow schematic illustrates one use of our novel waste water oxidation process in industry. Strong wastewater 10 containing the undesirable solutes is provided to the storage tank 12. The strong waste is then routed to the inlet of a pump 20 and then to the inlet of the electrochemical cell 30. Before the strong waste water reaches the inlet of the electrochemical cell oxygen gas 22 is injected in order to increase the concentration of dissolved oxygen in the waste water. The electrochemical cell 30 contains at least two electrodes manufactured from boron doped diamond, BDD, arranged such that the strong waste water can flow between the electrodes and contact both electrodes. More normally the electrochemical cell will contain several pairs of BDD electrodes arranged to form parallel flow paths through the unit. A power supply 40 is connected to the electrochemical cell and an electric current controlled in accordance with the power profile shown in FIG. 2 is caused to pass through the electrodes and the strong wastewater. After exiting the electrochemical cell the partially treated strong waste water is returned to the storage tank 12. The strong waste water is then re-circulated through the electrochemical cell several times until the concentration of the undesirable solutes is reduced to a required value at which time the pump and electrochemical cell are de-energized and the contents of the storage tank sent to discharge 16. The rate at which the undesirable solutes are destroyed can be increased by adding more electrochemical cells to the system. The addition of a second electrochemical cell to the system is indicated by the dotted lines. As the strong waste water is continually circulated through the electrical cell the water is heated. Cooling water 14 is provided to a heat exchanger in the storage tank to remove the heat and maintain the temperature of the strong wastewater at the required value.

FIG. 2 is a schematic representation of the sequence of the power applied to the electrochemical cell in one embodiment of our invention. A single complete cycle of the applied power sequence is shown in FIG. 2, the essential features of the applied power sequence can be described as:

CPD1: Between time $T_0$ and time $T_1$ a constant potential difference is applied across the cell. The value of the potential difference will be such as to ensure that the anodic potential is in the range of 2.0V to 2.7V vs SHE (Standard Hydrogen Electrode).

CC1: Between time $T_1$ and time $T_2$ a constant direct current is caused to flow through the electrochemical cell. The value of the current supplied to the cell is approximately equal to the current flowing through the cell in period CPD1

Polarity Reversal: following period CC1 at time $T_2$ the direction of the current flowing through the electrochemical cell is reversed.

CPD2: Between time $T_3$ and time $T_4$ a constant potential difference is applied across the cell. The value of the potential difference will be such as to ensure that the anodic potential is in the range of 2.0V to 2.7V vs SHE (Standard Hydrogen Electrode).

CC2: Between time $T_4$ and time $T_5$ a constant direct current is caused to flow through the electrochemical cell. The value of the current supplied to the cell is approximately equal to the current flowing through the cell in period CPD2

Polarity Reversal: following period CC2 at time $T_5$ the direction of the current flowing through the electrochemical cell is reversed.

After the second current reversal period the applied power sequence is repeated. The applied power sequence is repeated for as many times as necessary in order to effect the required reduction of the undesirable solutes.

Figure 3:
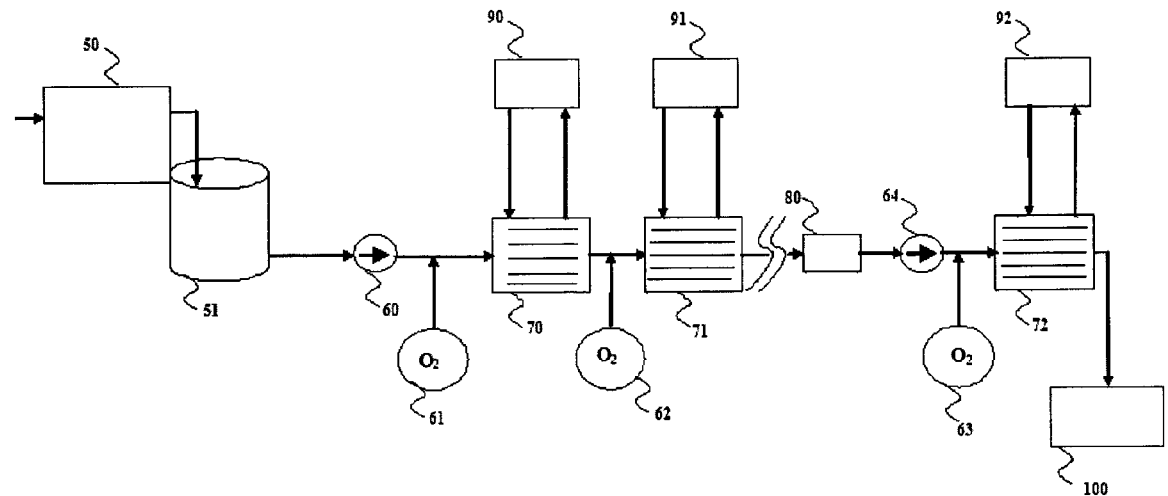
FIG. 3 illustrates a generalized flow diagram of an alternative way of employing our novel wastewater oxidation in a variety of applications and with a variety of feedwaters.

In FIG. 3 a generalized flow schematic illustrates an alternative use of our novel waste water oxidation process in industry. Strong waste water 50 containing the undesirable solutes is sent to a feed tank 51. The strong wastewater is then forwarded by a pump, 60, to the inlet of an electrochemical cell 70. At the pump outlet oxygen gas 61 is injected into the strong waste water to cause the concentration of oxygen dissolved in the strong wastewater to be increased.

The electrochemical cell 70 contains at least two electrodes manufactured from boron doped diamond, BDD, arranged such that the strong waste water can flow between the electrodes and contact both electrodes. More normally the electrochemical cell will contain several pairs of BDD electrodes arranged to form parallel flow paths through the unit. A power supply 90 is connected to the electrochemical cell and an electrical current controlled to the profile shown in FIG. 2 is caused to pass through the electrodes and the strong wastewater. After exiting the electrochemical cell the partially treated strong waste water is dosed with oxygen gas to ensure that the concentration of dissolved oxygen in the water is sufficient and then sent to the inlet of another electrochemical cell 71. The electrochemical cell 71 is similar to the electrochemical cell 70 and is connected to a power supply 91 which is controlled in exactly the same manner as power supply 90. After exiting the second electrochemical cell the strong waste water is subjected to treatment in subsequent similar electrochemical cells 72 until the concentration of the undesirable solutes is reduced to a value that allows the strong wastewater to be discharged, 100. The electrochemical cell 72 is similar to the electrochemical cell 70 and is connected to a power supply 92 which is controlled in exactly the same manner as power supply 90. Additional oxygen dosing 63 and pumps 64 are installed as required to maintain the concentration of dissolved oxygen and maintain the required flow through the system. As the strong wastewater passes through each electrochemical cell its temperature increases. At some point in the system a heat exchanger 80 is required to reduce the temperature.

Figure 4:
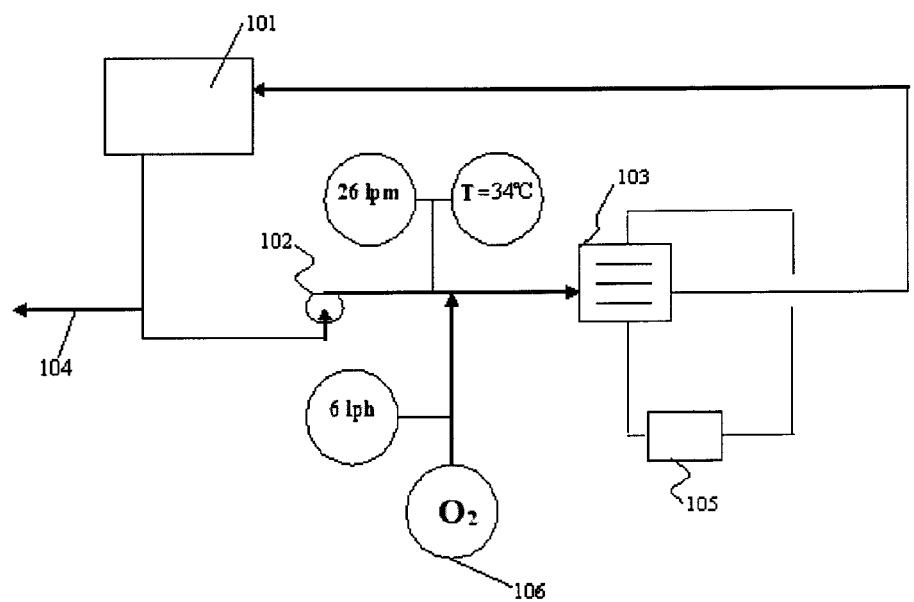
FIG. 4 illustrates a process flow diagram of the equipment utilized in a series of laboratory tests of our novel process for treating strong wastewaters.

In FIG. 4 a generalized flow schematic illustrates the laboratory set up which has been used by us to test various waste waters. Strong wastewater containing the undesirable solutes is provided to the storage tank 101. The strong waste is then routed to the inlet of a pump 102 and then to the inlet of the electrochemical cell 103. Before the strong waste water reaches the inlet of the electrochemical cell oxygen gas 106 is injected in order to increase the concentration of dissolved oxygen in the waste water. The electrochemical cell 103 contains at least two electrodes manufactured from boron doped diamond, BDD, arranged such that the strong waste water can flow between the electrodes and contact both electrodes. More normally the electrochemical cell will contain several pairs of BDD electrodes arranged to form parallel flow paths through the unit. A power supply 105 is connected to the electrochemical cell and an electric current controlled in accordance with the power profile shown in FIG. 2 is caused to pass through the electrodes and the strong wastewater. After exiting the electrochemical cell the partially treated strong waste water is returned to the storage tank 101. The strong waste water is then re-circulated through the electrochemical cell several times until the concentration of the undesirable solutes is reduced to a required value at which time the pump and electrochemical cell are de-energized and the contents of the storage tank sent to discharge 104.

By means of extensive studies, experiments, and the evaluation of the weaknesses of the existing processes, we have now developed a new process for the treatment of strong wastewaters. Importantly we have now confirmed that an electrochemical based oxidation system can be made to operate at levels of performance much greater than previously demonstrated by the prior art.

EXAMPLE 1

In one test, as shown in FIG. 4, a 10 liter volume of a wastewater from a pharmaceutical manufacturing process, with a conductivity of 67 mS/cm and a COD concentration of 49,150 mg/l was placed in the tank. The wastewater was circulated though the electrochemical cell, which contained electrodes manufactured from boron doped diamond, at a flowrate of 26 liters per minute (lpm). A small amount of oxygen, 6 liters per hour (lph) at NTP (NTP, normal temperature and pressure: standard conditions of 20° C. temperature and 1 atmosphere (101.325 kPa)), was injected into the wastewater at the inlet to the electrochemical cell. The water was treated over several hours until the COD was reduced to zero, during which time the total charge passed through the electrodes in the cell was 2,250,640 Coulomb. The power applied to the electrochemical cell had the profile as shown in FIG. 2.

EXAMPLE 2

In a second test a 10 liter volume of waste water with a conductivity of 58 mS/cm and a $NH_4$—N concentration of 13,600 mg/l was circulated through the cell. The re-circulating flowrate was 26 lpm and oxygen was injected at a rate of 6 lph. The water was treated over several hours until the $NH_4$—N concentration was reduced to zero, during which time the total charge passed through the electrodes in the cell was 932,571 Coulombs. The power applied to the electrochemical cell had the profile as shown in FIG. 2.

The exemplary results of such testing, and in particular the destruction of the undesirable solutes to a concentration that could not be determined analytically using commonly used analysis techniques, as well as the lower than would be expected, when compared with other prior art electrochemical processes, amount of energy used demonstrates the efficacy of this novel process.

The novel wastewater treatment process described herein can be practiced in many different industrial applications. For many important applications the feedwater to the process contains one, or even a number of organic solutes at high concentration. The relative concentration of each of the different organic compounds is uncontrolled and the total dissolved organic carbon, DOC, can be very high. The DOC can be effectively removed from the treated wastewater. The novel process can be used to effect any desired level of reduction of the DOC.

In other applications the feedwater will contain high concentrations of ammoniacal nitrogen, either as the only undesirable solute present, or in combination with other solutes such as various organic compounds, The novel process can effectively destroy all of the undesirable solutes present.

In another important application of the novel process the feedwater contains a mixture of solutes comprising of organic compounds, ammoniacal nitrogen, inorganic sulfides, and organic sulfides. All of the aforementioned solutes are effectively destroyed.

In other applications of the novel process the feedwater contains solutes which are effective bactericides, such as compounds containing the CN group or active pharmaceutical agents. All such solutes are destroyed by the process.

The novel process described herein can be practiced to treat a strong wastewater containing any or all of the aforementioned solutes in any combination to provide any desired reduction in the concentration of the undesirable solutes. The treatment of the waste water can be stopped at any time or it can be progressed until the contaminants are effectively destroyed.

The important features which make this invention novel are:

a) The process will perform successfully on virtually all types of strong waste waters—all other processes that we know cannot treat a wide range of waste waters b) The process will totally destroy the undesirable solutes—no other oxidation process, including the electro-oxidation systems/processes that have been developed by others, can achieve this. Using the novel process it is possible to achieve very low concentration of the pollutants, effectively zero mg/l.

c) The process is very cost effective and has low cost of ownership compared with all oxidation processes. In particular though it has a much lower operating cost than all other electro-oxidation processes using boron doped diamond electrodes.

It will thus be seen that the objects set forth above including those made apparent from the preceding description, are efficiently attained, and, since certain changes may be made in carrying out the above method and in construction of a suitable apparatus in which to practice the method and in which to produce the desired product as set forth herein, it is to be understood that the invention may be embodied in other specific forms without departing from the spirit or essential characteristics thereof. For example, while we have set forth an exemplary design for the oxidation and treatment of strong wastewaters, other embodiments are also feasible to attain the result of the principles of the method disclosed herein. Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As such, the claims are intended to cover the methods and structures described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

The invention claimed is:

1. A process for the treatment of a wastewater stream in electrochemical apparatus, said electrochemical apparatus comprising of at least one electrochemical cell containing suitable electrodes, to produce water with low concentrations of particular solutes, said process comprising:
   a) providing a feedwater stream which is a wastewater containing solutes therein, said solutes comprising any or all of the following:
   i) organic species or molecules;
   ii) ammoniacal nitrogen;
   iii) organic nitrogen;
   iv) inorganic sulfides;
   v) organic sulfides;
   vi) compounds containing the CN group;
   b) passing the feedwater from step a) through said electrochemical cell such that the water contacts the electrodes contained therein;
   c) causing a direct electrical current to flow through the electrochemical cell so as to destroy the undesirable solutes thereby producing a product water stream with a lower concentration of the undesirable solutes, said direct current to be varied and controlled to apply a specific power scheme to the electrochemical cell which includes at least one period of operation with a constant potential difference across the cell immediately followed by a period of operation with a constant current flowing through the cell;
   d) either returning the waste water passed through at least one of the electrochemical cells to the inlet of the electrochemical cell, or forwarding the partially treated waste water to the inlet of a subsequent electrochemical cell to which power is applied in accordance with step c) above, so as to effect a continuing treatment of the water to successively destroy the undesirable solutes present in said water; or jointly use of the above two methods.

2. The process as set forth in claim 1 wherein at step c) the duration of said period of operation with constant potential difference across the cell is selected to be within the range 0.001 seconds to 5 seconds and the value of the constant potential difference is selected to be within the range of zero volts and that required to cause the electrochemical cell anodic potential to be 2.6 volts versus SHE,
   wherein at step c), the value of the constant current is selected to be nominally equal to the current flowing through the cell at period of operation at constant potential difference above and the duration of said period of operation at constant current is greater than 0.001 second and less than 600 seconds.

3. The process as set forth in claim 1 wherein between step a) and step b), there is a preconditioning of the feedwater by any one of the following:
   i) injecting an oxidant into the feedwater stream in order to increase the concentration of molecular oxygen dissolved in the feedwater;
   ii) dosing a chemical into the feedwater stream in conjunction with the use of a catalyst in order to increase the concentration of molecular oxygen dissolved in the feedwater;
   iii) Increasing the concentration of molecular oxygen dissolved in the feedwater by a combination of i) and ii).

4. The process as set forth in claim 1 wherein at step c), the direct electrical current to be varied and controlled to effect the following applied power sequence, so as to optimize the generation of free radicals in the electrochemical cell and cause there to be an abundant population of said free radicals:
   i) A period of operation with a constant current flowing through the electrochemical cell;
   followed by
   ii) a period Of operation with a constant potential difference applied across the electrochemical cell;
   followed by
   iii) a period of operation with a constant current flowing through the electrochemical cell;
   followed by
   iv) repeating steps ii) and iii) wherein the number of repeat cycles of steps ii) and iii) is within the range zero to 300;
   followed by
   v) reversing the direction of the current passing through the electrochemical cell whilst maintaining the absolute magnitude of the current constant;
   followed by
   vi) A period of operation with a constant current flowing through the electrochemical cell;
   followed by
   vii) a period of operation with a constant potential difference applied across the electrochemical cell;
   followed by
   viii) a period of operation with a constant current flowing through the electrochemical cell;
   followed by
   ix) repeating steps vii) and viii) wherein the number of repeat cycles of steps v) and vi) is within the range zero to 300;
   followed by
   x) reversing the direction of the current passing through the electrochemical cell whilst maintaining the absolute magnitude of the current constant;
   followed by
   xi) Repeating steps i) to x).

5. The process as set forth in claim 4 wherein at step c) i) the duration of said period of operation is selected to be within the range of zero seconds to 600 seconds;
- wherein at step c) ii) the duration of said period of operation is selected to be within the range 0.001 seconds to 5 seconds and the value of the constant potential difference is selected to be within the range of zero volts and that required to cause the electrochemical cell anodic potential to be 2.7 volts versus SHE;
- wherein at step c)iii), the value of the constant current is selected to be nominally equal to the current flowing through the cell at the end of the period of operation at constant potential difference in step c) ii) and the duration of said period of operation at constant current is greater than 0.001 second and less than 600 seconds;
- wherein at step c)iv), for any repeating cycle, the values of the parameters: duration of each period, constant potential difference, and constant current are selected to remain within the ranges of said parameters specified previously in steps c) ii) and c)iii), but the quantitative value could either keep the same or change within the range of variation;
- wherein at step c) vi) the duration of said period of operation is selected to be in the range zero seconds to 600 seconds;
- wherein at step c) vii) the duration of said period of operation is selected to be within the range 0.001 seconds to 5 seconds and the value of the constant potential difference is selected to be within the range of zero volts and that required to cause the electrochemical cell anodic potential to be 2.7 volts versus SHE;
- wherein at step c) viii), the value of the constant current is selected to be nominally equal to the current flowing through the cell at period of operation at constant potential difference in c) vii) and the duration of said period of operation at constant current is greater than 0.001 second and less than 600 seconds;
- wherein at step c) ix), for any repeating cycle, the values of the parameters: duration of each period, constant potential difference, and constant current are selected to remain within the ranges of said parameters specified previously in steps c)vii) and c)viii), but the quantitative value could either keep the same or change within the range of variation.

6. The process as set forth in claim 5 wherein at step c) ii) the value of the constant potential difference is selected to be within the range of zero volts and that required to cause the electrochemical cell anodic potential to be 2.5 volts versus SHE,
- wherein at step c) vii) the value of the constant potential difference is selected to be within the range of zero volts and that required to cause the electrochemical cell anodic potential to be 2.5 volts versus SHE.

7. The process as set forth in claim 6 wherein at step c) ii) the value of the constant potential difference is selected to be in the range of zero volts and that required to cause oxygen gas to start to be evolved at the surface of the anode in the electrochemical cell;
- wherein at step c) vii) the value of the constant potential difference is selected to be in the range of zero volts and that required to cause oxygen gas to start to be evolved at the surface of the anode in the electrochemical cell.

8. The process as set forth in claim 1 where the electrochemical cell contains electrodes manufactured from boron doped diamond, or contains electrodes on which the onset of oxygen evolution occurs at an anodic potential of greater than 2.0 volts versus. SHE (Standard Hydrogen Electrode).

9. The process as set forth in claim 1 wherein the destruction of undesirable solutes is continued such that their concentration is reduced to less than 35% of their concentration in the feedwater.

10. The process as set forth in claim 9 wherein the destruction of undesirable solutes is continued such that their concentration is reduced to less than 20% of their concentration in the feedwater.

11. The process as set forth in claim 10 wherein the destruction of undesirable solutes is continued such that their concentration is reduced to less than 10% of their concentration in the feedwater.

12. The process as set forth in claim 11 wherein the destruction of undesirable solutes is continued such that their concentration is reduced to less than 1% of their concentration in the feedwater.

* * * * *